United States Patent
Stickle et al.

(10) Patent No.: US 11,349,832 B2
(45) Date of Patent: *May 31, 2022

(54) ACCOUNT RECOVERY

(71) Applicant: Amazon Technologies, Inc., Seattle, WA (US)

(72) Inventors: Thomas Charles Stickle, Saint James, NY (US); Robert Eric Fitzgerald, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 32 days.

This patent is subject to a terminal disclaimer.

(21) Appl. No.: 16/824,383

(22) Filed: Mar. 19, 2020

(65) Prior Publication Data
US 2020/0220868 A1 Jul. 9, 2020

Related U.S. Application Data

(63) Continuation of application No. 15/178,479, filed on Jun. 9, 2016, now Pat. No. 10,601,816.

(51) Int. Cl.
*H04L 9/40* (2022.01)
*H04W 4/14* (2009.01)

(52) U.S. Cl.
CPC ........ *H04L 63/0853* (2013.01); *H04L 63/101* (2013.01); *H04W 4/14* (2013.01)

(58) Field of Classification Search
CPC .......................... H04L 63/0853; H04L 63/101
USPC .......................................................... 726/6
See application file for complete search history.

(56) References Cited

U.S. PATENT DOCUMENTS

| | | | |
|---|---|---|---|
| 2003/0189592 A1 | 10/2003 | Boresjo | |
| 2004/0030992 A1* | 2/2004 | Moisa | G06Q 10/10 715/234 |
| 2004/0098366 A1* | 5/2004 | Sinclair | G06F 21/6245 |
| 2005/0132033 A1* | 6/2005 | Russo | G06Q 30/02 709/223 |

(Continued)

OTHER PUBLICATIONS

"AWS Identity and Access Management (IAM)," .COPYRGT. 2016 Amazon Web Services, Inc., or its Affiliates, <https://aws.amazon.com/iam/> [retrievedJun. 9, 2016], 8 pages.

(Continued)

*Primary Examiner* — Jacob Lipman
(74) *Attorney, Agent, or Firm* — Davis Wright Tremaine LLP

(57) ABSTRACT

A user-promotion process allows a service provider to grant the security roles associated with a target user account to a requester by obtaining approvals from a quorum of approving users. The quorum requirements and the identity of the approving users may be established by the target user or an account manager. Upon receiving, from a promotion candidate, a request to assume security roles of a target user, the service provider identifies the approving users from the target user's account record. Approvals are requested from the approving users, and if a quorum of approvals is received by the service provider, the promotion candidate is allowed to assume the roles of the target user. If a quorum of approvals is not received, then substitute approving users may be identified based at least in part on those approving users that did not respond to the approval request.

20 Claims, 10 Drawing Sheets

(56) References Cited

U.S. PATENT DOCUMENTS

2011/0173214 A1* 7/2011 Karim .................. G06F 16/148
707/754
2011/0258316 A1 10/2011 Rizk
2014/0143028 A1* 5/2014 Howe .................... G06Q 50/01
705/12

OTHER PUBLICATIONS

"How Do I Get Security Credentials," .COPYRGT. 2016 Amazon Web Services, Inc., or its Affiliates, <http://docs.aws.amazon.com/general/latest/gr/getting-aws.sec.creds.ht-ml> [retrieved Jun. 9, 2016], 3 pages.

* cited by examiner

ACCOUNT RECOVERY

CROSS-REFERENCE TO RELATED APPLICATION

This application is a continuation of U.S. patent application Ser. No. 15/178,479, filed Jun. 9, 2016, entitled "ACCOUNT RECOVERY," the disclosure of which is herein incorporated by reference in its entirety.

BACKGROUND

Many businesses rely on a variety of online services as part of their computing infrastructure. Online services may be provided by one or more service providers. Some service providers provide online services to businesses by providing a responsible individual associated with the business with credentials that allow access to a master account. The master account is granted the ability to create subordinate accounts and user accounts for other responsible individuals and employees of the business. The master account is often one of the first accounts granted to the business, and the responsible individual may enable multifactor authentication, or take other measures to secure the master account. The holder of the master account creates the subordinate accounts used by the business, and through the course of business, business data is generated and maintained by the service provider. If a business user loses their credentials or leaves the company, the responsible individual associated with the master account may be able to reset the credentials to regain access to the business user's account.

However, asserting control from one account over another has inherent risks. How, for example, can the holder of the master account be sure that the person requesting a password reset is authorized to do so? In addition, if the credentials of the master account are lost, corrupted, or become inaccessible for some reason, there may be no other account under the control of the business that can reclaim the privileges granted to the master account. Requesting an account reset from the service provider again has similar risks associated with reestablishing trust between the requester and the service provider. For example, if the service provider attempts to authenticate that the requestor has access to the phone number and email associated with the account, an attacker may attempt to divert the phone number to a line controlled by the attacker. For at least this reason, the problem of reestablishing trust between a service provider and an account holder is a difficult problem.

BRIEF DESCRIPTION OF THE DRAWINGS

Various techniques will be described with reference to the drawings, in which.

DETAILED DESCRIPTION

Figure 1:
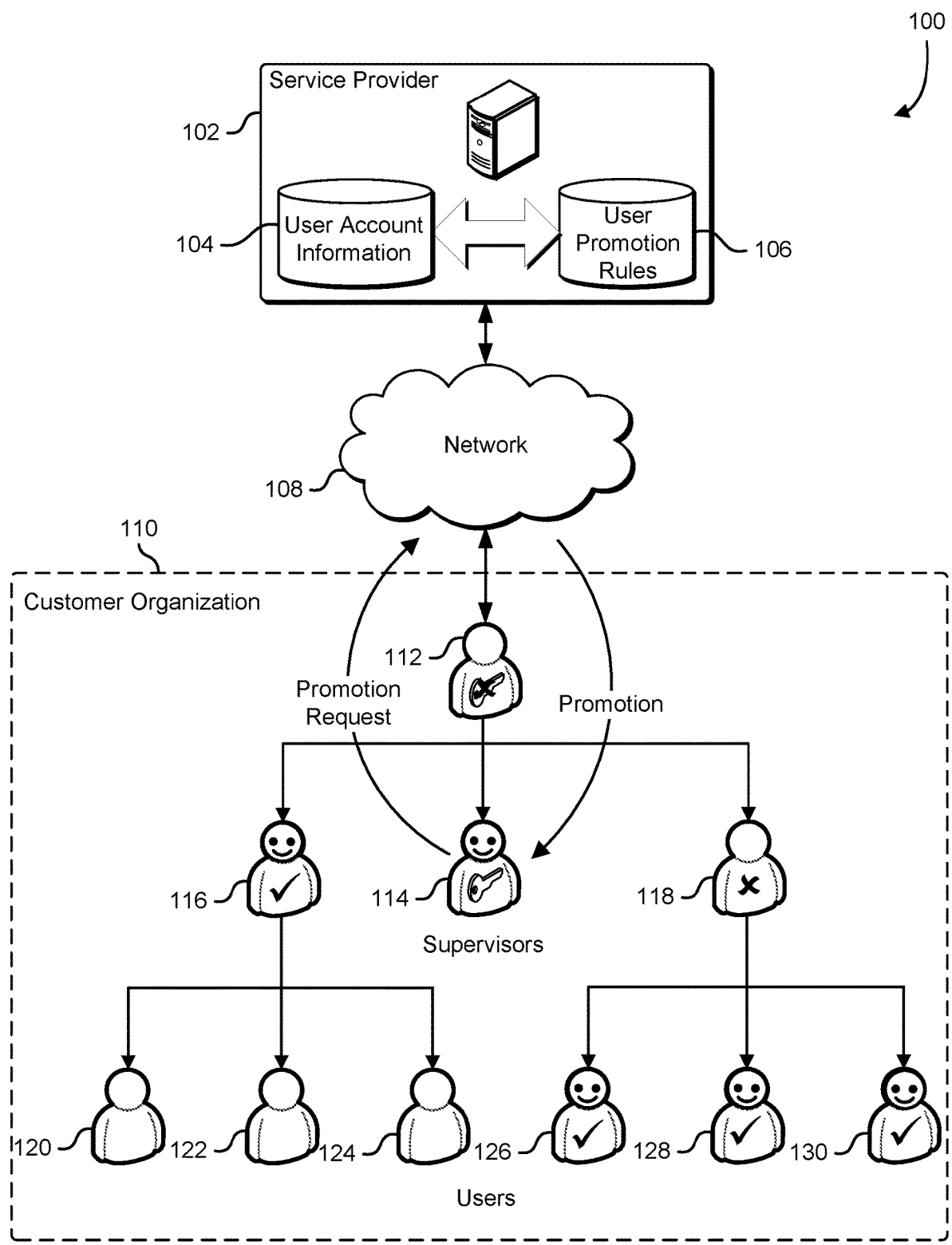
FIG. 1 shows an illustrative example of an environment in which various embodiments may be practiced.

The current document describes a system that allows service account holders to recover security roles or accounts that have become inaccessible without having to re-establish trust with the service provider. An account manager, account administrator, or other entity responsible for managing the service account, specifies a set of promotion rules that, when satisfied, allows an existing user account to assume the security roles of another account. An existing user, using their existing account, sends a request to the service provider to assume the security roles of a target user. The service provider uses the promotion rules to identify a list of approving users that can approve the request. In general, the approving users are not individually capable of granting the security roles to the existing user. A set of quorum criteria specifies the number of required approvals, and a timeout for receiving the required approvals. In some implementations, substitutions for approving users may be made by using an approval tree. For example, approvals for an unresponsive approver may fall to a set of sub-approvers subject to corresponding sub-quorum criteria. If the appropriate approvals are received by the service provider, the service provider grants the roles of the target user to the existing user. By promoting an existing user in accordance with rules provided by the account holder, the service provider transfers decision making authority to the account holders, and reduces the risks associated with certain social engineering attacks on the service.

When the customer such as a business or organization opens a new account with the service provider, the service provider provides the customer with a root account and associated initial credentials. The customer provides the initial credentials to an account manager such as a system administrator, IT manager, or other responsible individual. The account manager generates and distributes additional user accounts that, in general, have lower security privileges than the account manager. In order to secure the account, the account manager will generally change the initial credentials to a value known only to the account manager. The account manager may add multi-factor authentication to the root account. Multi-factor authentication may be in the form of a biometric fingerprint, retina scan, a voiceprint, or image. In some examples, the multi-factor authentication may be generated using an authentication device that produces a periodically updating one-time use password ("OTP"). In general, when the account is initially created, there is little or no customer data maintained by the service. Therefore, establishing trust between the service provider and the customer has a correspondingly low risk. In many examples, as the service is used over time, increasing amounts of customer data is maintained by the service, and risks associated with reestablishing trust between the service provider and the customer are correspondingly increased.

As part of generating and distributing additional user accounts, the account manager generates a set of rules that defines when the roles of a target user may be assumed by another user. More than one set of rules may be defined. A set of succession rules may be defined that describe approvals needed to assume the roles of an unresponsive or absent user. A set of override rules may be defined that describe approvals needed to assume the roles of a present or hostile user. The set of rules can be organized in a tree structure with the target user positioned at the root of the tree, and potential approvers represented at successively lower levels of the tree structure. If a particular approver is unresponsive to a request for promotion, substitute approvers from lower levels of the tree structure may be used to replace the unresponsive approver. For example, the set of rules may specify that the roles of the account manager may be assumed by the requester if three directors approve the request. If only two directors are available, succession rules for the missing director may be applied so that the approval of three supervisors may be substituted for the missing director. A quorum criteria may limit the number of substitutions or recursions allowed when assuming the roles of a particular user.

FIG. 1 shows an illustrative example of an environment in which various embodiments may be practiced. An environment 100 includes a service provider 102 that maintains a user account database 104 and a promotion rules database 106. The service provider 102 is hosted by a server computer system, server cluster, or virtual computing environment, and provides a service to a customer organization filed on a computer network 108. The computer network 108 may be a local area network, a wide-area network, a wireless network, or the Internet. The user account database 104 contains user account information such as usernames, passwords, credentials, credential hashes, contact information, email addresses, and digital certificates associated with particular users. The user account database 104 specifies the service-access rights granted to a user in the form of one or more security roles assigned to the user. Each security role grants one or more service-access rights. For example, a user security role may grant the right to access the service, and read customer information maintained by the service. An administrative security role may grant the right to add additional accounts to the service, and delete customer information maintained by the service. The promotion rules database 106 includes one or more sets of promotion rules. The promotion rules specify when security roles associated with a particular user in the user account database 104 may be assumed by a requesting user.

A customer organization 110 includes a number of users arranged in accordance with an organizational hierarchy of the customer. A system administrator 112 is provided with a root account for the customer organization 110. The system administrator 112 generates and distributes a number of subordinate accounts to additional members of the customer organization 110 including three supervisors 114, 116, and 118, and six subordinate users 120, 122, 124, 126, 128, and 130. In addition to generating and distributing the accounts to the members of the customer organization 110, the system administrator 112 submits the promotion rules to the service provider 102. In some examples, the system administrator 112 generates a set of promotion rules and submits the promotion rules to the service provider 102 by an application programming interface ("API"). The promotion rules may be submitted in the form of an XML file that specifies the promotion rules for the entire organization, or configuration file that specifies the promotion rules for each service account controlled by the customer organization 110.

In the example shown in FIG. 1, the promotion rules submitted by the system administrator 112 specify that the three supervisors 114, 116, and 118 may approve the promotion of any user within the customer organization 110 to assume the roles of the system administrator 112. In addition, the roles of any of the supervisors 114, 116, and 118 may be assumed after approval by three subordinates of the corresponding supervisor. If the system administrator 112 leaves the organization, loses access to their credentials, or is otherwise incapacitated, a requesting supervisor 114 may submit a request to the service provider 102 to assume the roles of the system administrator 112.

The service provider 102 receives, from the requesting supervisor 114, a request to assume the security roles of the system administrator 112. The service provider 102 queries the promotion rules database 106 and retrieves the promotion rules corresponding to the system administrator 112. The promotion rules identify the three supervisors 114, 116, and 118 as being approvers for the promotion request. The service provider 102 sends an approval request to each of the three supervisors 114, 116, and 118. In the example shown in FIG. 1, a first supervisor 116 returns an approval to the service provider 102, and a second supervisor 118 does not respond to the promotion request. In some examples, a request is sent to the requesting supervisor 114, and the requesting supervisor 114 may approve or deny the promotion request. In another example, the service provider 102 assumes that the requesting supervisor 114 approves of the promotion request. In yet another example, the service provider 102 assumes that the requesting supervisor 114 is unavailable for approval, and queries the promotion rules database 106 for substitute approvers.

If a time allowed for approval expires without receiving the necessary approvals, the service provider 102 may seek substitute approvers for those approvals that were not received. Since the second supervisor 118 did not provide an approval or disapproval to the service provider 102, the service provider 102 identifies the subordinate users 126, 128, and 130 of the second supervisor 118 as substitute approvers. The service provider 102 sends approval request to the subordinate users 126, 128, and 130, requesting approval of the promotion request submitted by the requesting supervisor 114. In various examples, the substitute approvers are notified that they are acting on behalf of the second supervisor 118. The subordinate users 126, 128, and 130 return approvals to the service provider 102. As a result of receiving the approvals from the three subordinate users and the two remaining supervisors, the service provider 102 grants the promotion request. The service provider 102 retrieves the roles assigned to the system administrator 112, and grants the roles to the requesting supervisor 114. The requesting supervisor 114 may generate a new administrative account, assume the role of system administrator for the organization, or reset the credentials of the administrative account.

If the service provider 102 does not receive the appropriate approvals from either the identified approving accounts or combination of approving accounts and substitute approving accounts within a configured amount of time, the promotion request submitted by the requesting supervisor 114 is denied. In some examples, a notification of the promotion request is sent to the system administrator 112. If the system administrator 112 responds to the notification by denying the request, the service provider 102 denies the promotion request notwithstanding any approvals. In some examples, if the system administrator 112 responds to the notification by denying the request, the service provider 102 retrieves a different, more rigorous set of promotion rules designated for use when an active account is being overridden.

Figure 2:
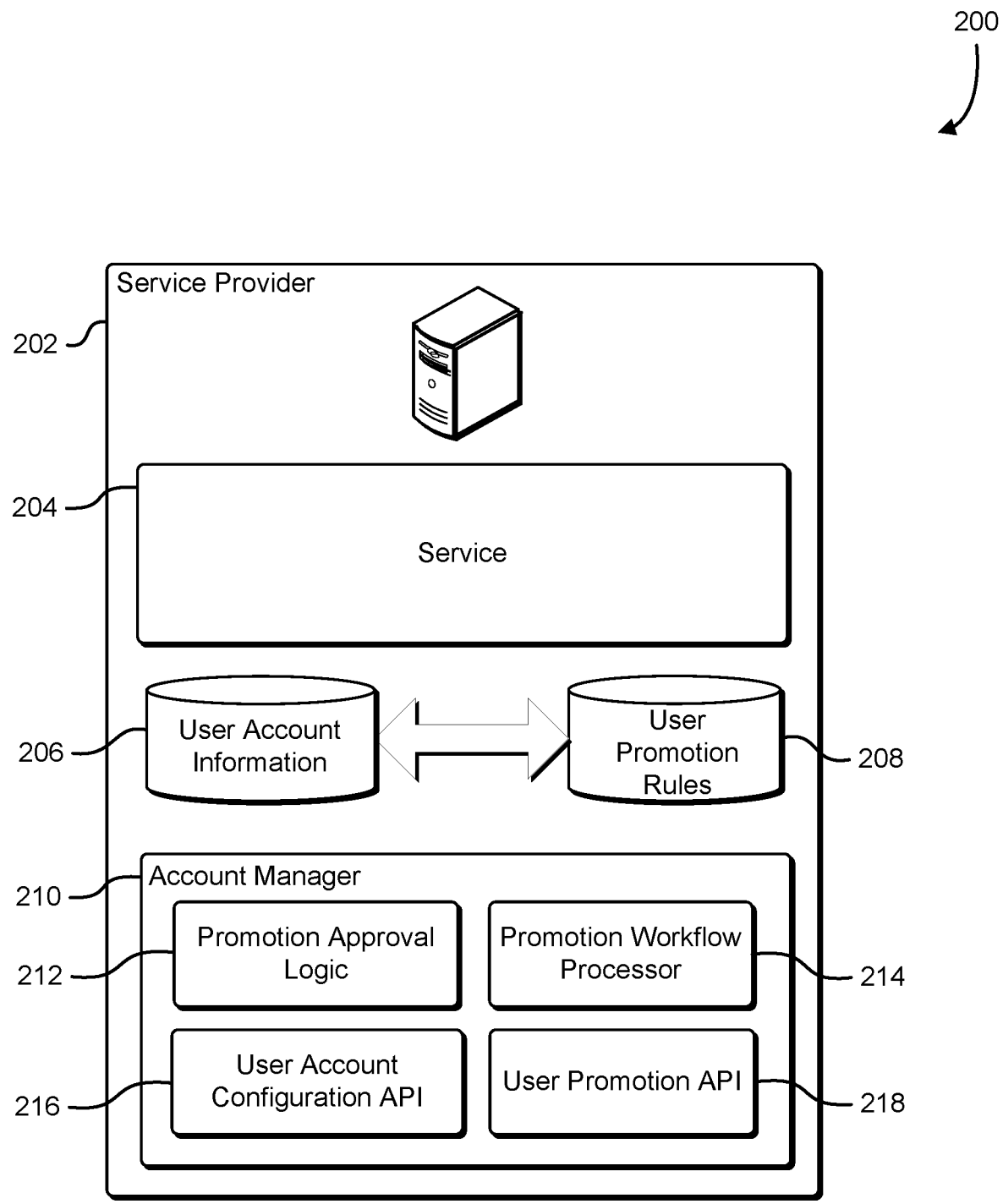
FIG. 2 shows an illustrative example of a service provider that maintains, in association with user account information, a set of user promotion rules which allow the service provider to promote particular users in response to confirmed promotion requests.

FIG. 2 shows an illustrative example of a service provider that maintains, in association with user account information, a set of user promotion rules which allow the service provider to promote particular users in response to confirmed promotion requests. A diagram 200 shows a service provider 202 that makes a service 204 accessible to customers via a computer network. The service 204 can be a storage service, a cryptography service, a payment service, a database service, or a virtual computing service. Access to the service 204 is controlled by a database of user account information 206. The database of user account information 206 may include credential information, digital certificates, user identification, user contact information such as email addresses and phone numbers, and biometric hashes. Each user in the database of user account information 206 may have one or more associated security roles. A security role is a bundle of privileges or access rights to access the service 204. A database of user promotion rules 208 is maintained in association with user account information 206. The database of user promotion rules 208 specifies, for a particular user, a set of users that may approve requests from other users to assume the security roles of the particular user.

Management of the user account information 206 and the associated user promotion rules 208 is accomplished by an account manager 210. The account manager 210 includes promotion approval logic 212, a promotion workflow processor 214, a user account configuration API 216, and the user promotion API 218. The user account configuration API 216 provides an interface to customers that allows customers to add, modify, and configure user accounts in the database of user account information 206. For example, the user account configuration API 216 allows users to change the password of an account, add a new account, or add promotion rules for an account. In some implementations, the user account configuration API 216 allows an administrator or user to submit a list of approving users that may be used to assume the roles of a particular user account. In some examples, the user whose roles may be assumed specifies the approving users and associated quorum criteria. In another example, an administrator specifies approving users and associated quorum criteria for a number of users under the control of the administrator.

Requests to assume the security roles of another user are received by the user promotion API 218. The user promotion API 218 identifies the requesting user and the target user whose security roles are requested. The promotion workflow processor 214 retrieves the promotion rules associated with the target user from the database of user promotion rules 208 and identifies a set of approving users. The promotion workflow processor 214 sends requests to each user in the set of approving users. The request may take the form of an email, automated phone call, text message, or instant message directed to each user in the set of approving users using contact information extracted from the user account information 206. A recipient of a request may respond to the request by replying to the email, depressing a particular key number in response to a prompt from the automated phone call, replying to the text message, or replying to the instant message. The responses are received by the promotion approval logic 212. The promotion approval logic 212 tabulates the responses and determines, based at least in part on quorum criteria associated with the applicable promotion rules, whether to grant the request.

If the promotion approval logic 212 determines that the quorum criteria associated with the applicable promotion rules has been met by the received responses, the promotion approval logic 212 identifies the roles assigned to the target user, and grants the identified roles to the requesting user. If the promotion approval logic 212 determines that the quorum criteria associated with the applicable promotion rules has not been met, actions may be taken to acquire additional approvals. In some examples, the promotion approval logic 212 will identify the approving users that did not respond to the original request and resend the request via another communication medium such as an alternate phone number, alternate email address, or alternate protocol. In another example, the promotion approval logic 212 will cause the promotion workflow processor 214 to identify and request approval from a substitute approving users for those users that did not respond to the original request. If the promotion approval logic 212 determines that approval has been denied, or that no additional substitute approving users are available, the promotion approval logic 212 will deny the request.

In some examples, the user promotion API 218 authenticates requests for promotion from user candidates by confirming the identity of the user candidate and notifying the target user whose security roles are to be assumed by the user candidate. The user promotion API 218 notifies the target user of the request by the user candidate. If the target user does not respond to the notification, the user promotion API 218 causes the promotion workflow processor 214 to process the request using a set of succession rules that are applicable when the target user is unavailable, incapacitated, or otherwise unresponsive. If the target user responds to the notification by approving the request, the request may be granted without processing the promotion request. If the target user responds to the notification by denying the request, the user promotion API 218 causes the promotion workflow processor 214 to process the request using a set of override rules that are applicable when the target user is available and responsive, but hostile to the organization. For example, override rules may be applicable if the administrator account is compromised by an attacker, but succession rules may be applicable if the administrator password is lost.

Figure 3:
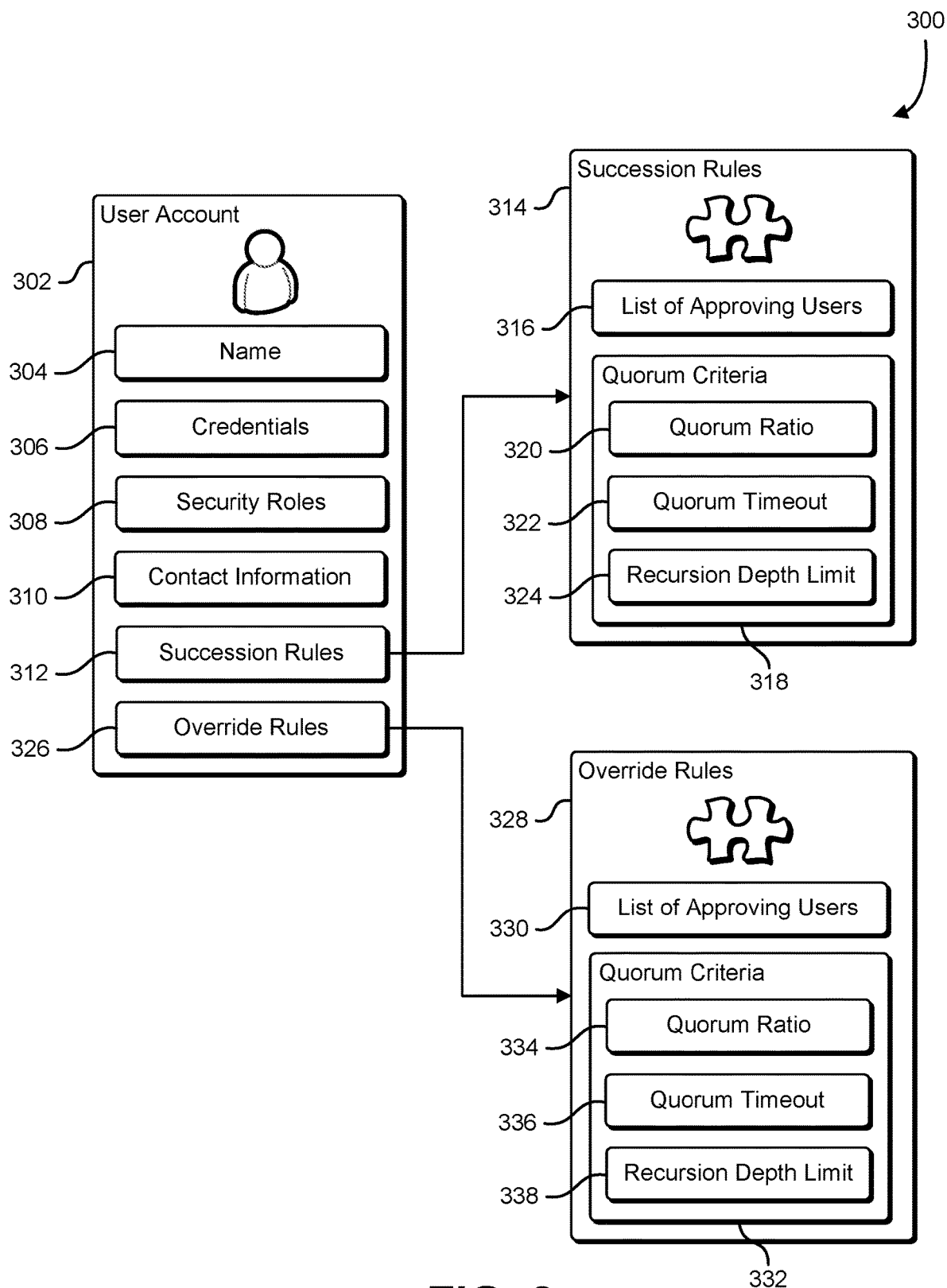
FIG. 3 shows an illustrative example of a data structure that may be used to maintain user-account information and user-promotion rules.

FIG. 3 shows an illustrative example of a data structure that may be used to maintain user-account information and user-promotion rules. A data structure diagram 300 shows data structures for retaining a user account 302 and two associated sets of promotion rules. The user account 302 includes a name field 304, a credentials list 306, a security roles collection 308, and a contact information field 310. The name field 304 holds the name of the account. The name of the account may be a proper name, nickname, or login name for the user account 302. The credentials list 306 holds the credentials used to authenticate login requests. The credentials list 306 may include a plurality of credentials, and more than one form of credentials may be necessary to authenticate a login request. The credentials may be stored in the form of a cryptographic hash such as a password hash or a biometric hash. The security roles collection 308 specifies the security roles granted to the user account 302. The user account 302 is granted access rights to the service based at least in part on an aggregation of the access rights granted to the security roles granted to the user account 302. The contact information field 310 includes information that may be used to contact the user such as an email address, phone number, post office address, instant messenger account, and cell phone number. The contact information field 310 may include a preference order for contact information. The preference order may be used by the promotion workflow processor when processing approval requests.

The user account 302 includes a succession rules reference 312. The succession rules reference 312 points to a succession rules record 314. A succession rules record 314 includes a list of approving users 316 and quorum criteria 318. The list of approving users 316 identifies a number of user accounts that may be solicited for approvals when a promotion request requests the assumption of the security roles of the user account 302. The quorum criteria 318 describes the approvals necessary to grant the requested roles when the target request is unresponsive. The quorum criteria 318 includes a quorum ratio 320, a quorum timeout 322, and the recursion depth limit 324. The quorum ratio 320 specifies the proportion of approving users from the list of approving users 316 that are necessary to approve the request. The quorum timeout 322 specifies an amount of time within which the approvals must be received from the approving users. The recursion depth limit 324 restricts the number of substitutions that may be attempted when a quorum of approving users is not received within the quorum timeout 322. For example, if a particular user of the list of approving users does not respond to the request for approval, the system may query the user account associated with the particular user to identify substitute approving users based on the list of approving users associated with the particular user and the quorum criteria associated with a particular user. The above process may be repeated, but the total number of the substitution cycles is limited by the recursion depth limit 324.

In some examples, the promotion rules may include a list of approving users that includes an exclusion list. The exclusion list identifies a set of users that may not approve the request for promotion. For example, the exclusion list may specify that the entity that specified the promotion rules may not act as an approver. In another example, the exclusion list may specify that the requester of the promotion may not act as an approver of the promotion.

In some implementations, the promotion rules specify a workflow. The workflow may specify one or more approval steps. Each step involves an approval acquired from a particular subset of approvers. For example, the workflow may specify a sequence in which approvals are acquired. The workflow may require that the approval of a first user be acquired, then the approval of a second user, followed by the approval of the third user. By specifying a sequence of approvals, the number of outstanding approval requests generated by the promotion process may be reduced.

The user account 302 includes an override rules reference 326 that points to an override rules record 328. The override rules record 328 describes the approvals necessary to grant the requested roles when the target account opposes the request. The override rules record 328 includes a list of approving users 330 and quorum criteria 332. The quorum criteria 332 includes a quorum ratio 334, a quorum timeout 336, and the recursion depth limit 338. The quorum ratio 334 specifies the proportion of approving users from the list of approving users 330 that are necessary to approve the request. The quorum timeout 336 specifies an amount of time within which the approvals must be received from the approving users. The recursion depth limit 338 restricts the number of substitutions that may be attempted when a quorum of approving users is not received within the quorum timeout 336. For example, if a particular user of the list of approving users does not respond to the request for approval, the system may query the user account associated with the particular user to identify substitute approving users based on the list of approving users associated with the particular user and the quorum criteria associated with a particular user. The above process may be repeated, but the total number of the substitution cycles is limited by the recursion depth limit 338.

Figure 4:
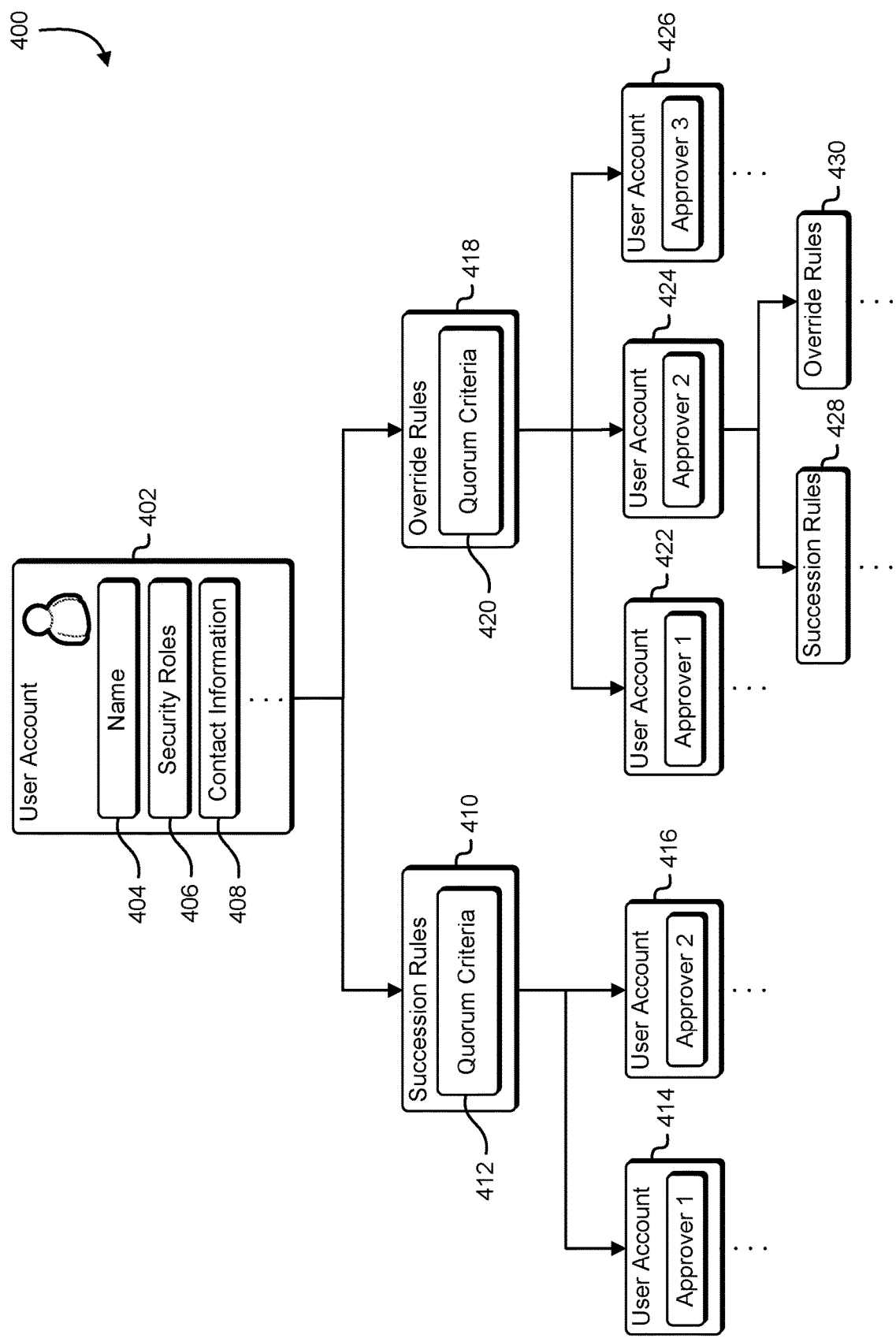
FIG. 4 shows an illustrative example of a user-promotion tree that identifies, for a user account, a collection of approving user accounts for assuming the user's roles via succession, and a collection of approving user accounts for assuming the user's roles via override.

FIG. 4 shows an illustrative example of a user-promotion tree that identifies, for a user account, a collection of approving user accounts for assuming the user's roles via succession, and a collection of approving user accounts for assuming the user's roles via override. A data diagram 400 shows a tree structure of user accounts and promotion rules that can be used to approve a promotion request. A user account 402 includes a name field 404, a set of security roles 406, and a set of contact information 408. The name field 404 may include a nickname, and assigned username, or user ID associated with the user account 402. The set of security roles 406 identifies one or more security roles, each security role in the set of security roles 406 granting a set of access privileges to a service. In some examples, the user account 402 may specify a collection of access rights and privileges that are associated directly with user account 402.

The user account 402 is linked to two sets of promotion rules. A set of succession rules 410 includes a set of quorum criteria 412, and is linked to a number of approving user accounts 414, and 416. The set of succession rules 410 is applicable when a requester makes a request to a service to assume the roles of a target user, and the target user does not oppose the request. A set of override rules 418 includes a set of quorum criteria 420, and is linked to a number of approving user accounts 422, 424, and 426. The set of override rules 418 is applicable when a requester makes a request to a service to assume the roles of the target user, and the target user indicates, to the service, that the target user opposes the request for promotion. A particular user account 424 may be linked to promotion rules that apply to the particular approving account. For example, the particular user account 424 is linked to a set of succession rules 428, and a set of override rules 430 that are linked to the particular user account 424.

If a candidate user sends a request to a service to assume the roles of the user account 402, the service retrieves the contact information 408 from the user account 402, and sends a notification to the user indicating that the candidate user has submitted a request to assume the roles of the user account 402. If the user responds to the notification by denying the request, the service applies the set of override rules 418 when determining whether to approve the request. The service retrieves the quorum criteria 420 from the set of override rules 418, and identifies the approving user accounts 422, 424, and 426. The quorum criteria 420 specify a number or ratio of approving user accounts necessary to approve the request. The service sends an approval request to each of the approving user accounts 422, 424, and 426. If the service receives approvals from at least the necessary number or ratio of approving user accounts, the request is approved and the candidate user is granted the roles of the user account 402. If the necessary number of approvals is not received by the service, the service may issue additional requests for approval based on promotion rules associated with approving user accounts that did not respond to the approval request.

For example, if the particular user account 424 does not respond to an approval request from the service, the service may use promotion rules associated with the particular user account 424 to generate a set of substitute approvers. The set of succession rules 428 may be used by the service to identify the set of substitute approvers. Substitute approval requests are sent to each substitute approver in the set of substitute approvers. The service determines, based at least in part on quorum criteria associated with the set of succession rules 428, whether substitute approvals received from the set of substitute approvers are sufficient to replace the approval of the particular user account 424. In some examples, substitute approvers may override a negative approval of the particular user account 424 by applying the set of override rules 430 to the substitute approval process. The substitute approval process may be applied recursively, acquiring substitute approvals for substitute approvals. The level of recursion of the substitute approval process may be limited by parameters included in the quorum criteria.

Figure 5:
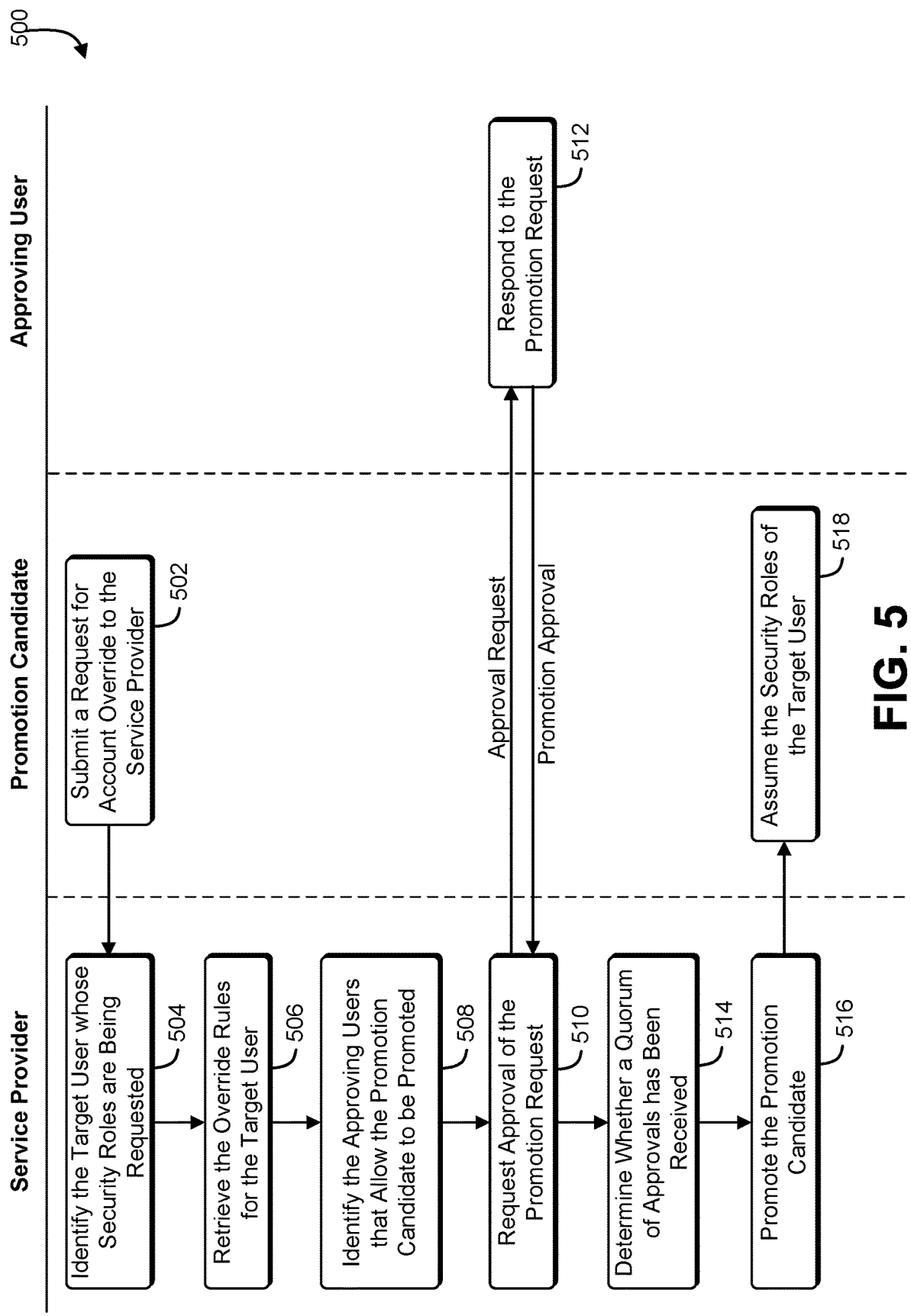
FIG. 5 shows an illustrative example of a process that, as a result of being performed by a service provider, promotion candidate, and approving user, allows the promotion candidate to assume the security roles of a target user by override.

FIG. 5 shows an illustrative example of a process that, as a result of being performed by a service provider, promotion candidate, and approving user, allows the promotion candidate to assume the security roles of a target user by override. A swim diagram 500 shows a process that begins at block 502 where the promotion candidate submits, to the service provider, a request to assume the security roles of the target user. The target user may be an account administrator, a root account, or other user account having service access privileges greater than those of the promotion candidate.

At block 504, service provider receives the request from the promotion candidate, and identifies the target user. In some examples, the service provider confirms that the promotion candidate is within a set of allowable promotion candidates associated with the target user. For example, if the target user is a system administrator, the promotion rules may specify that only a user that is a director may assume the roles of the system administrator. If a user that is not a director submits a request to assume the roles of the system administrator, the request will be denied by the service provider. The service provider notifies the target user of the request to assume the target user's security roles. If the target user does not respond to the notification, the service provider may use a set of succession rules to determine whether the request should be granted. If the target user responds to the notification, and opposes the request, the service provider applies a set of override rules to determine whether the request should be granted. In the example shown in FIG. 5, the target user opposes the request, and the service provider retrieves 506 the override rules associated with the target user. Based at least in part on the set of override rules, the service provider identifies 508 a set of approving users that allow the promotion candidate to assume the roles of the target user.

The service provider sends 510 an approval request to each approving user in the set of approving users. At block 512, the approving user receives the approval request and responds by approving the promotion request. The approval request may take the form of a text message, an email message, a phone call from an automated voice response service, or an instant message. The approving user may respond with a corresponding response text message, response email, handset button press sequence, or instant message response. The service provider monitors communication channels associated with the expected responses. As responses are received from various approving users, the service provider determines 514 whether a quorum of approvals has been received. If a quorum of approvals has been received from the approving users, execution advances to block 516 where the service provider promotes the promotion candidate to assume the roles of the target user. If, within an amount of time that is based at least in part on the override rules, a quorum of approvals has not been received from the approving users, the service provider may deny the request. In some examples, the service provider may identify additional approving users based on approving users that have not approved the promotion request.

At block 516, the service provider promotes the promotion candidate. Promoting the promotion candidate involves identifying the security roles which are assigned to the target user, and granting the identified security roles to the promotion candidate. The service provider notifies the promotion candidate that the promotion request has been granted. At block 518, the promotion candidate receives the notification and assumes the security roles of the target user.

Figure 6:
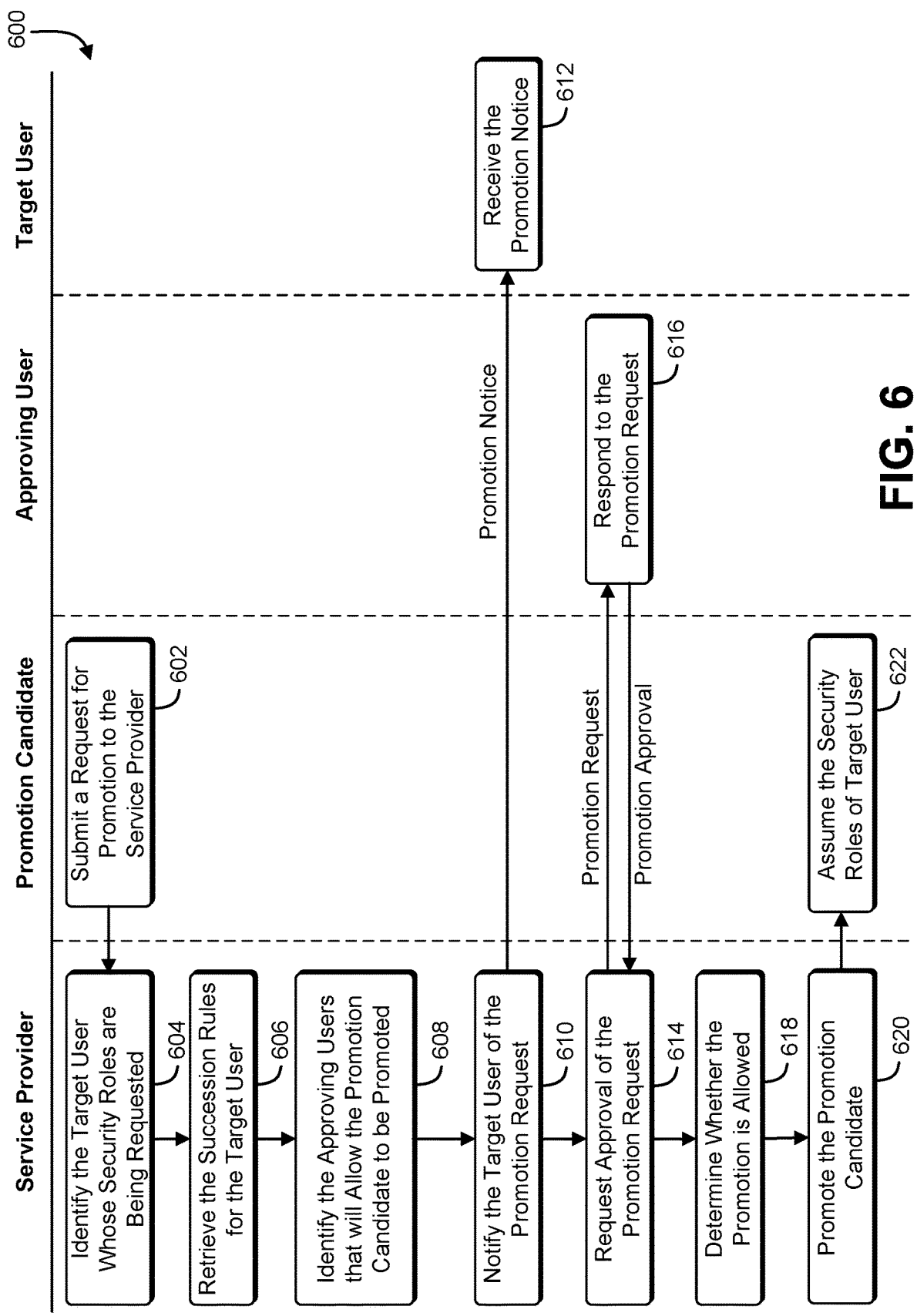
FIG. 6 shows an illustrative example of a process that, as a result of being performed by a service provider, a promotion candidate, an approving user, and a target user, allows the promotion candidate to assume the security roles of the target user by succession.

FIG. 6 shows an illustrative example of a process that, as a result of being performed by a service provider, a promotion candidate, an approving user, and a target user, allows the promotion candidate to assume the security roles of the target user by succession. A swim diagram 600 shows a process that begins at block 602 where the promotion candidate submits, to the service provider, a request to assume the security roles of the target user. The target user may be an account administrator, a root account, or other user account having service access privileges greater than those of the promotion candidate.

At block 604, a service provider receives the request from the promotion candidate, and identifies the target user. In some examples, the service provider confirms that the promotion candidate is within a set of allowable promotion candidates associated with the target user. A list of allowable promotion candidates may be maintained in a data store in association with the promotion rules maintained by the service provider. When the service provider receives a request for promotion, the service provider can identify the promotion candidate and confirm that the promotion candidate is contained in the list of allowable promotion candidates. For example, if the target user is a system administrator, the promotion rules may specify that only a user that is a director may assume the roles of the system administrator. If a user that is not a director submits a request to assume the roles of the system administrator, the request will be denied by the service provider. At block 606, the service provider retrieves a set of succession rules that are associated with the target user. Based at least in part on the set of succession rules, the service provider identifies 608 a set of approving users that allow the promotion candidate to assume the roles of the target user.

The service provider sends 610 a notification to the target user of the request to assume the target user's security roles. At block 612, the target user receives the notification from the service provider. In the example shown in FIG. 6, the target user receives the notification of the request, but does not respond to the notification. In some examples, if the target user replies to the notification by indicating that the target user approves of the request, the request is granted by the service provider. If the target user replies to the notification by indicating that the target user opposes the request, the request may be denied, or the service provider may retrieve a set of override rules associated with the target user and return to block 608 and attempt to approve the request using the approving users identified by the override rules. In various implementations, the service provider waits for a minimum amount of time before determining that the target user has not responded to the notification. The minimum amount of time, or timeout, may be an amount of time before sending the approval request to the approving users, or may run in parallel while collecting responses from approving users.

The service provider sends 614 an approval request to each approving user in the set of approving users. At block 616, the approving user receives the approval request and responds by approving the promotion request. The approval request may take the form of a text message, an email message, a phone call from an automated voice response service, or an instant message. The approving user may respond with a corresponding response text message, response email, handset button press sequence, or instant message response. The service provider monitors communication channels associated with the expected responses. As responses are received from various approving users, the service provider determines 618 whether a quorum of approvals has been received. If a quorum of approvals has been received from the approving users, execution advances to block 620 where the service provider promotes the promotion candidate to assume the roles of the target user. If, within an amount of time that is based at least in part on the override rules, a quorum of approvals has not been received from the approving users, the service provider may deny the request. In some examples, the service provider may identify additional approving users based on approving users that have not approved the promotion request.

At block 620, the service provider promotes the promotion candidate. Promoting the promotion candidate involves identifying the security roles which are assigned to the target user, and granting the identified security roles to the promotion candidate. The service provider notifies the promotion candidate that the promotion request has been granted. At block 622, the promotion candidate receives the notification and assumes the security roles of the target user.

Figure 7:
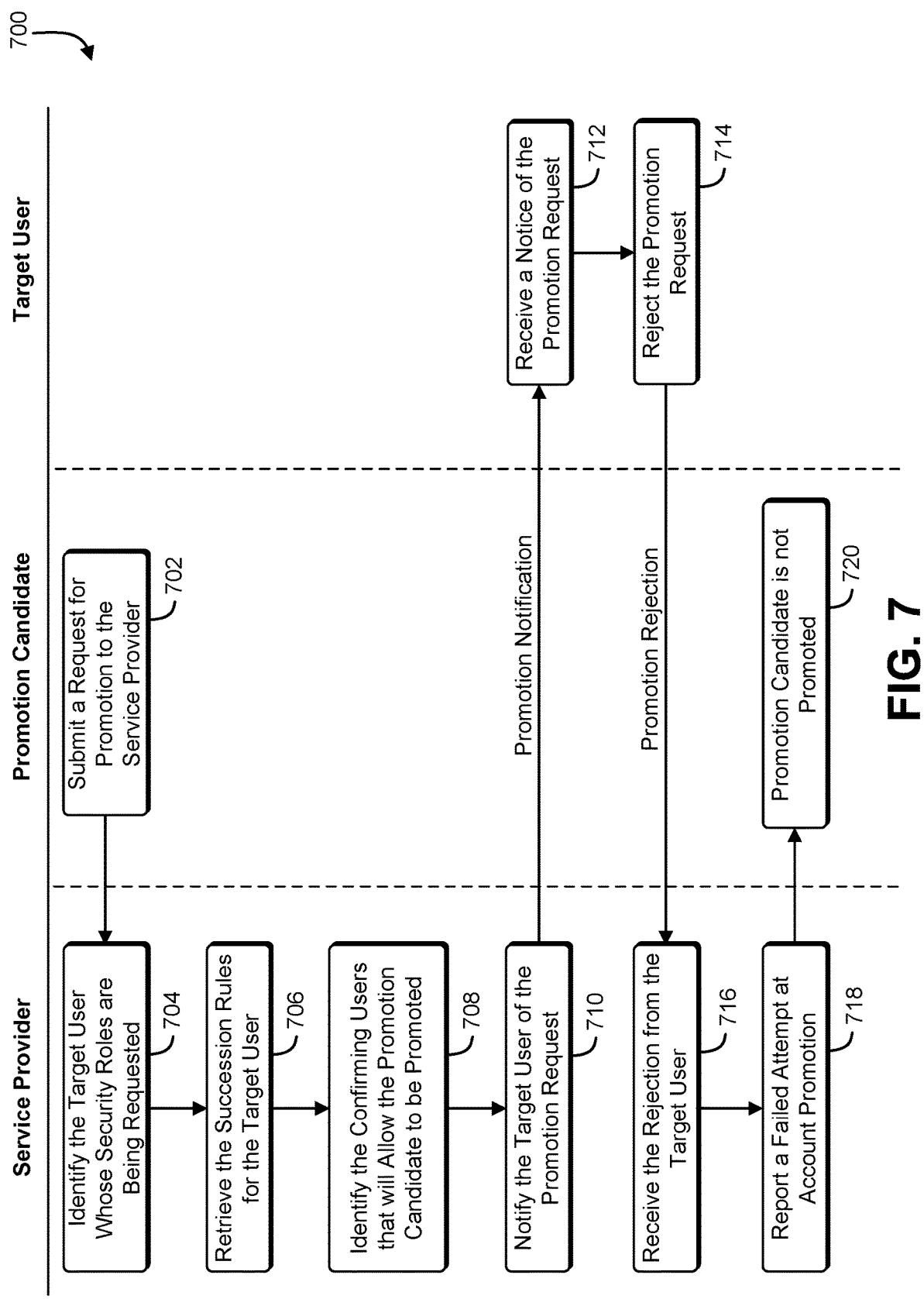
FIG. 7 shows an illustrative example of a process that, as a result of being performed by a service provider, a promotion candidate, and a target user, blocks a promotion candidate from assuming the security roles of the target user.

FIG. 7 shows an illustrative example of a process that, as a result of being performed by a service provider, a promotion candidate, and a target user, blocks a promotion candidate from assuming the security roles of the target user. A swim diagram 700 shows a process that begins at block 702 where the promotion candidate submits, to the service provider, a request to assume the security roles of the target user. The target user may be an account administrator, a root account, or other user account having service access privileges greater than those of the promotion candidate.

At block 704, the service provider receives the request from the promotion candidate, and identifies the target user. In some examples, the service provider confirms that the promotion candidate is within a set of allowable promotion candidates associated with the target user. A list of allowable promotion candidates may be maintained in a data store in association with the promotion rules maintained by the service provider. When the service provider receives a request for promotion, the service provider can identify the promotion candidate and confirm that the promotion candidate is contained in the list of allowable promotion candidates. For example, if the target user is a system administrator, the promotion rules may specify that only a user that is a director may assume the roles of the system administrator. If a user that is not a director submits a request to assume the roles of the system administrator, the request will be denied by the service provider. At block 706, the service provider retrieves a set of succession rules that are associated with the target user. Based at least in part on the set of succession rules, the service provider identifies 708 a set of approving users that allow the promotion candidate to assume the roles of the target user.

The service provider sends 710 a notification to the target user of the request to assume the target user's security roles. At block 712, the target user receives the notification from the service provider. In the example shown in FIG. 7, the target user receives the notification of the request. In response to the notification, the target user sends 714 a rejection of the promotion request to the service provider. At block 716, the service provider receives the rejection from the target user. In some examples, in response to the receipt of the rejection, the service provider may retrieve a set of override rules associated with the target user and return to block 708 and attempt to approve the promotion request by using the approving users identified by the override rules.

At block 718, the service provider reports, to the promotion candidate, that the promotion attempt has been denied. The promotion candidate receives 720 the notification from the service provider, and the promotion candidate does not assume the roles of the target user.

Figure 8:
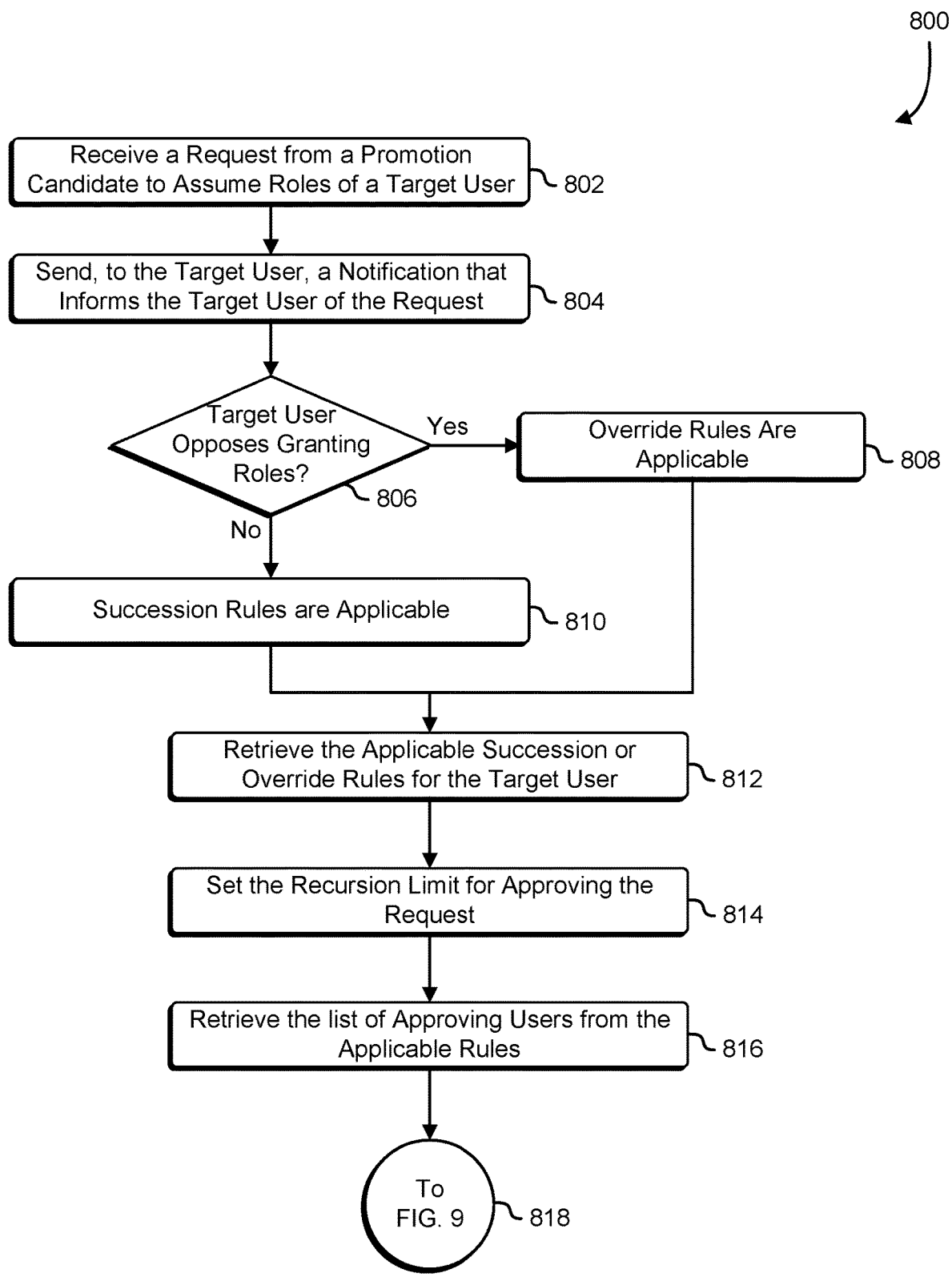
FIG. 8 shows a first portion of an illustrative example of a process that, as a result of being performed by a service provider, determines whether a candidate user may assume the roles of a target user based at least in part on responses received from a number of approving users.

FIG. 8 shows a first portion of an illustrative example of a process that, as a result of being performed by a service provider, determines whether a candidate user may assume the roles of a target user based at least in part on responses received from a number of approving users. A first portion of a process diagram 800 shows a portion of a process that begins at block 802 with a service provider receiving a request from a promotion candidate. The request identifies a target user whose security roles are requested by the promotion candidate. The service provider sends 804 a notification to the target user informing the target user of the request to assume the target user's security roles. The notification may be sent using email, voicemail, phone call, instant message, text message, or other communication channels accessible to the service provider. The service provider waits for an amount of time and monitors communication channels for a response to the notification. At decision block 806, if the service provider receives a response from the target user indicating that the target user opposes granting the target user's security roles to the promotion candidate, execution advances to block 808 and the service provider identifies a set of override rules associated with the target user. If the service provider does not receive a response, execution advances to block 810 and the service provider identifies a set of succession rules that are associated with the target user.

At block 812, the service provider retrieves the identified set of rules. The rules identify a set of users that can approve the request for promotion, as well as a set of quorum criteria. The quorum criteria includes a recursion limit for substituting approving users, applicable timeouts when waiting for approval responses from approving users, and a ratio or number of approving users necessary for approval of the promotion request. At block 814, the service provider uses the information in the quorum criteria to set a recursion limit for approving the request. The service provider then retrieves 816, from the identified set of rules, the set of approving users for the request. At connection circle 818, the process continues to a corresponding connection circle on FIG. 9.

Figure 9:
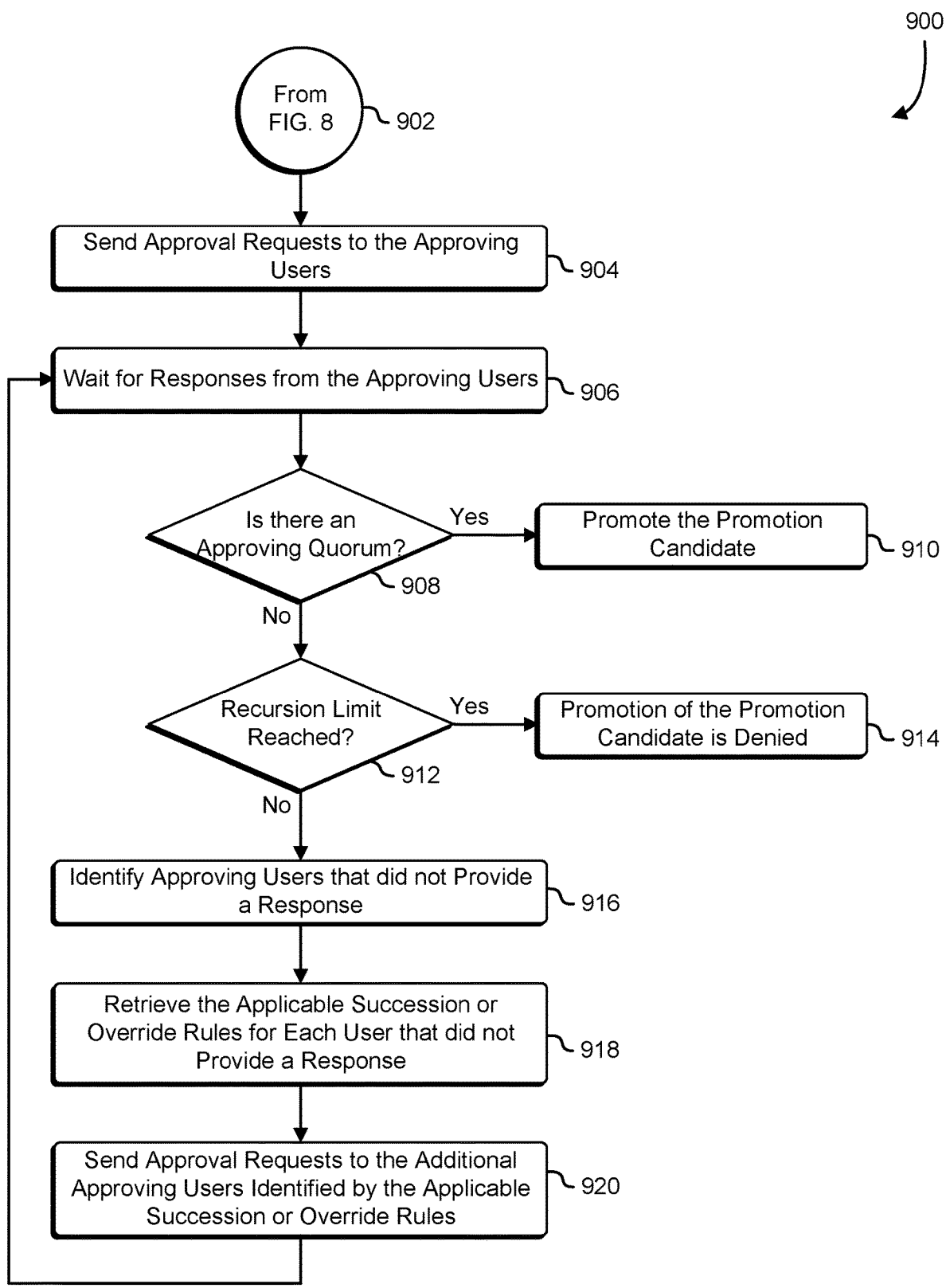
FIG. 9 shows a second portion of an illustrative example of a process that, as a result of being performed by a service provider, determines whether a candidate user may assume the roles of a target user based at least in part on responses received from a number of approving users.

FIG. 9 shows a second portion of an illustrative example of a process that, as a result of being performed by a service provider, determines whether a candidate user may assume the roles of a target user based at least in part on responses received from a number of approving users. The second portion of a process diagram 900 shows a portion of a process that continues from FIG. 8 at a connection circle 902. At block 904, the service provider sends approval requests to the set of approving users identified and retrieved above. The approval request can take the form of emails, voicemails, text messages, or instant messages. The service provider waits 906 for an amount of time for responses from the approving users. The amount of time may be provided by the quorum criteria associated with the promotion rules which are applicable to the request.

After the amount of time has elapsed, the service provider tabulates the responses received from the approving users and determines 908 whether the responses constitute an approving quorum based at least in part on the quorum criteria associated with the applicable promotion rules. If the received responses constitute a quorum as specified by the quorum criteria, the service provider promotes 910 the promotion candidate by granting the promotion candidate the security roles associated with the target user. If the received responses do not constitute a quorum, the service provider determines 912 whether the recursion limit specified in the quorum criteria has been reached. If the recursion limit has been reached, the service provider denies 914 the promotion request and the promotion candidate is not granted the security roles of the target user.

If there is not an approving quorum and the recursion limit has not been reached, execution advances to block 916 where the service provider identifies those approving users that did not provide a response to the approval request. For each approving user that did not provide a response to the approval request, the service provider retrieves 918 succession rules or override rules associated with the non-responding approving user. In some examples, the service provider uses succession rules when an approving user does not respond to an approval request and override rules when an approving user denies an approval request. In another example, the service provider may use succession rules when an approving user does not respond to an approval request, and does not allow substitute approvers if the approving user denies the approval request. In yet another example, the service provider uses rules corresponding to the type of rules used in the previous approval level. At block 920, the service provider sends additional approval requests to the additional approving users identified in block 918. The process returns to block 906 where responses received as a result of the additional approval requests are used by the service provider to determine whether sufficient additional approval requests are received to substitute for missing approval requests. During each loop of the process, the service provider determines whether approving quorums exist at the level of approvers, sub-approvers and additional subordinate approvers until either a combination of approvers and subordinate approvers satisfies the quorum requirements to approve the request, or the recursion limit is reached and no additional substitute approvers are available.

Figure 10:
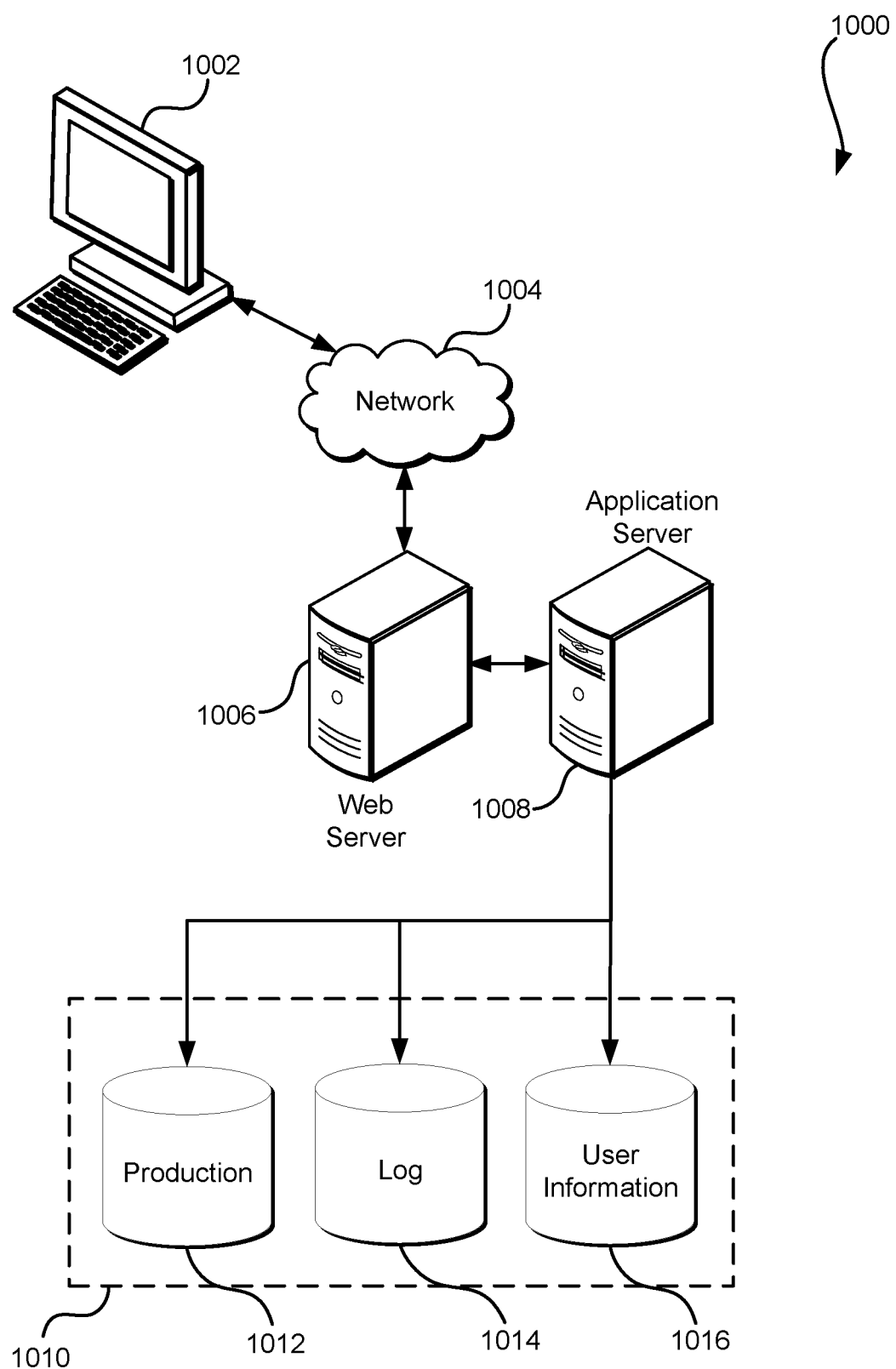
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes, and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining a promotion request to grant, to a candidate user account of a computer system, a security role associated with a target user account of the computer system, the security role granting at least one service-access right of the computer system not possessed by the candidate user account, the service-access right including management of a virtual computing service provided as a service by the computing system, the target user account being an account manager with greater security privileges than a set of approving user accounts that includes a plurality of user accounts and where the account manager generated each of the plurality of user accounts of the set of approving user accounts; and
    as a result of determining that a set of approvals from a set of approving user accounts is sufficient to grant the promotion request, granting the security role to the candidate user account to replace the target user account with the candidate user account as the account manager.

2. The computer-implemented method of claim 1, wherein promotion rules identify the set of approving user accounts at least in part by specifying an exclusion list, the exclusion list identifying a set of users that are not permitted to approve the promotion request.

3. The computer-implemented method of claim 1, further comprising:
    identifying a set of promotion rules associated with the target user account, the set of promotion rules identifying the set of approving user accounts and quorum criteria including a timeout value, a recursion limit, and a quorum ratio, the set of promotion rules stored in a database maintained by the computer system in association with the candidate user account.

4. The computer-implemented method of claim 1, further comprising:
    providing a notification to a target user associated with the target user account, the notification indicating to the target user that the candidate user account has requested a security role associated with the target user;
    obtaining, from the target user, a response approving of the promotion request; and
    as a result of obtaining the response, granting the security role to the candidate user account.

5. The computer-implemented method of claim 1, further comprising:
    providing a notification to a target user associated with the target user account, the notification indicating to the target user that the candidate user account has requested a security role associated with the target user account;
    determining that a response from the target user was not obtained within a timeout; and
    as a result of determining that a response from the target user was not obtained, granting the security role to the candidate user account.

6. The computer-implemented method of claim 1, further comprising:
    providing, to a set of client computer systems associated with the set of approving user accounts, requests to approve the promotion request;
    obtaining, in response to the requests to approve the promotion request, a set of approvals from at least a subset of the set of client computer systems; and
    determining, based at least in part on a set of quorum criteria, whether the set of approvals is sufficient to grant the promotion request.

7. A system, comprising at least one computing device that implements one or more services, wherein the one or more services:
  identify, from a database of user account information, a candidate account of a service provider that lacks an access right to the service provider, the access right being associated with a target account of the service provider and including management of a cryptography service provided as a service by the service provider, the service provider defining, during creation of user accounts of a set of approving user accounts by the service provider, security privileges of the set of approving user accounts that are lower than the target account; and
  grant the access right to the candidate account as a result of obtaining a set of approvals that constitute a quorum of a set of approving users.

8. The system of claim 7, wherein the one or more services further:
  identify a set of allowable promotion candidates;
  determine that the candidate account is not in the set of allowable promotion candidates; and
  as a result of determining that the candidate account is not in the set of allowable promotion candidates, not granting the access right to the candidate account.

9. The system of claim 7, wherein:
  a set of promotion rules specify a workflow; and
  the set of approvals that constitute the quorum of the set of approving users are obtained in accordance with the workflow specified by the set of promotion rules.

10. The system of claim 7, wherein the one or more services:
  obtain one or more approvals of the set of approvals at least in part by causing an SMS message to be sent to at least one user of the set of approving users; and
  obtain responses by at least in part obtaining a responsive SMS message from the at least one user of the set of approving users.

11. The system of claim 7, wherein the one or more services:
  obtain approvals authorized by a set of approving user accounts at least in part by causing an e-mail message to be transmitted to at least one user in the set of approving users, the e-mail message including a hyperlink that, as a result of being clicked, causes a reply to be generated and provided to the at least one computing device; and
  obtain responses by at least in part obtaining the reply.

12. The system of claim 7, wherein no single user of the set of approving users is capable of granting the access right to the candidate account.

13. The system of claim 7, wherein the one or more services further transmit a notification to a communication endpoint identified using contact information associated with the target account.

14. The system of claim 13, wherein the one or more services further:
  obtain a response to the notification indicating opposition to the candidate account being granted the access right; and
  as a result of obtaining the response, grant the access right to the candidate account.

15. A non-transitory computer-readable storage medium comprising executable instructions that, as a result of being executed by one or more processors of a computer system, cause the computer system to at least:
  identify, in a database of user account information for the computer system, a target user account that has an access right to the computer system not held by a candidate user account; the access right including management of a payment service provided as a service by the computer system; and
  as a result of obtaining at least a quorum of approvals, cause the access right to be granted to the candidate user account, the quorum of approvals obtained from at least one approving user account that was generated by the target user account.

16. The non-transitory computer-readable storage medium of claim 15, wherein the instructions that cause the computer system to identify a set of authorized approvers further include instructions that cause the computer system to add a set of user accounts with the access right to the set of authorized approvers.

17. The non-transitory computer-readable storage medium of claim 15, wherein the instructions further comprise instructions that, as a result of being executed by the one or more processors, cause the computer system to as a result of causing the access right to be granted to the candidate user account, notify a set of authorized approving accounts that the access right has been granted to the candidate user account.

18. The non-transitory computer-readable storage medium of claim 15, wherein the instructions further comprise instructions that, as a result of being executed by the one or more processors, cause the computer system to:
  as a result of not Obtaining at least a quorum of approvals, attempt to obtain additional approvals from approvers chosen from a set of additional approvers, the set of additional approvers chosen from a set of authorized approvers from which neither an approval nor a disapproval was obtained;
  determine whether approvals obtained as a result of attempting to obtain at least a quorum of approvals in combination with the additional approvals comprise a quorum of approvals; and
  as a result of determining that the approvals obtained as a result of attempting to obtain at least the quorum of approvals combined with the additional approvals comprise a quorum of approvals, cause the access right to be granted to the candidate user account.

19. The non-transitory computer-readable storage medium of claim 15, wherein the instructions further comprise instructions that, as a result of being executed by the one or more processors, cause the computer system to:
  as a result of not obtaining at least a quorum of approvals, attempt to obtain additional approvals from approvers chosen from a set of additional approvers, the set of additional approvers chosen from a set of possible approvers from which a disapproval was obtained;
  determine whether approvals obtained as a result of attempting to obtain at least a quorum of approvals in combination with the additional approvals comprise a quorum of approvals; and
  as a result of determining that the approvals obtained as a result of attempting to obtain at least the quorum of approvals combined with the additional approvals comprise a quorum of approvals, cause the access right to be granted to the candidate user account.

20. The non-transitory computer-readable storage medium of claim 15, wherein the instructions further comprise instructions that, as a result of being executed by the one or more processors, cause the computer system to:

attempt to obtain additional approvals from approvers chosen from a set of authorized approvers from which neither an approval was not obtained; and repeat the step of attempting to obtain additional approvals subject to a recursion limit provided by an administrator associated with the target user account.

\* \* \* \* \*